Figure 1:
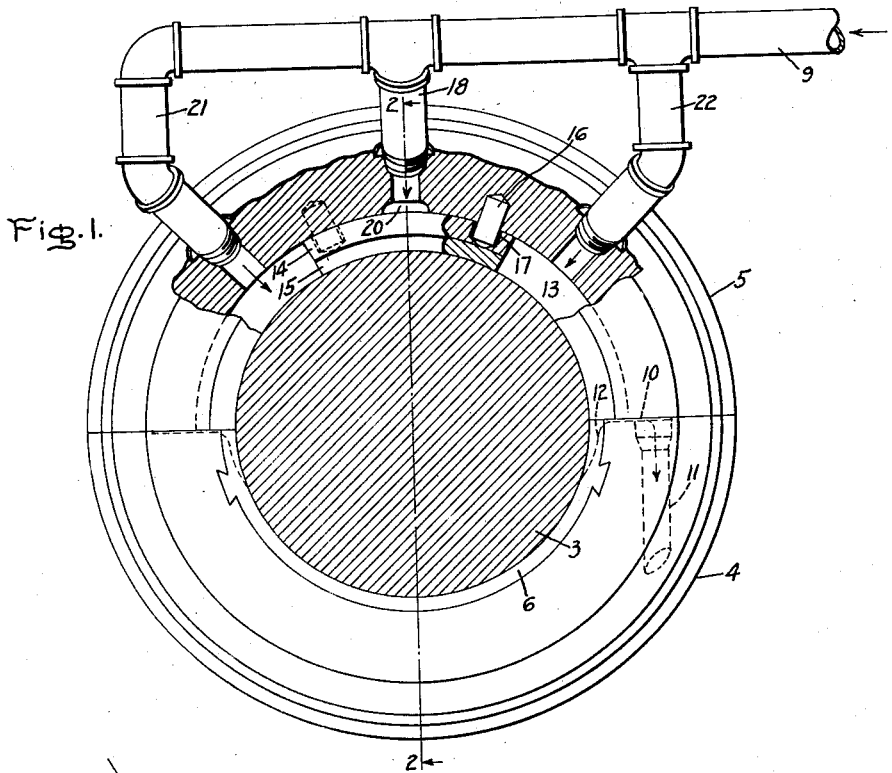

June 11, 1935.   J. H. DORAN   2,004,783
SHAFT BEARING
Filed April 28, 1932

Inventor:
John H. Doran,
by Charles E. Tullar
His Attorney.

Patented June 11, 1935

2,004,783

UNITED STATES PATENT OFFICE 2,004,783

SHAFT BEARING

John H. Doran, Scotia, N. Y., assignor to General Electric Company, a corporation of New York Application April 28, 1932, Serial No. 607,999

8 Claims. (Cl. 308—9)

The present invention relates to bearings for supporting rotary shafts.

It has been observed that shafts running in journal bearings develop vibratory and whirling disturbances, particularly at speeds above twice critical speeds. Also, shafts running in journal bearings at less than twice critical speeds but carrying light loads or loads changeable in direction have a tendency towards instability and frequently cause the shaft to vibrate, thus developing unstable behavior known as whirling and whipping of the shaft.

The object of my invention is to provide an improved arrangement for bearings in which the whipping and whirling motions of the shaft are effectively dampened or prevented.

For a consideration of what I believe to be novel, and my invention, attention is directed to the following description and the claims appended thereto in connection with the drawing which forms a part of my specification.

Figure 2:
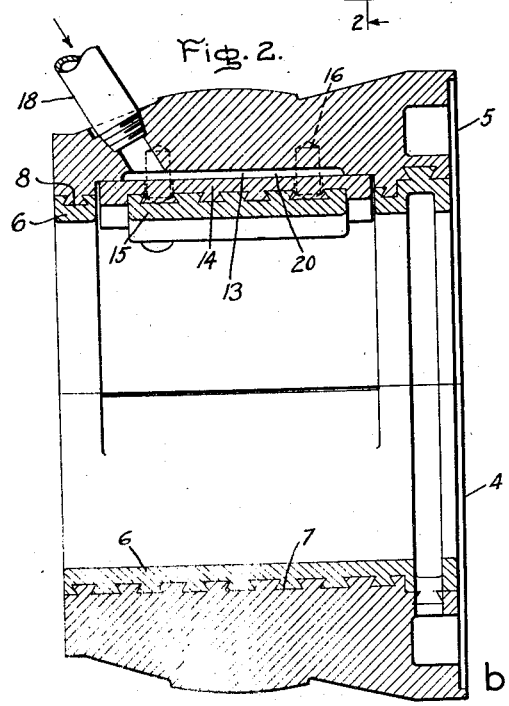

In the drawing, Fig. 1 is a view, partly broken away, of a bearing embodying my invention, and Fig. 2 is a cross sectional view along line 2—2 of Fig. 1.

Referring to the drawing, 3 is a rotary shaft supported by a bearing which has been shown as comprising a lower half 4 and an upper half 5 engaging each other along a horizontal plane through the axis of rotation. 6 designates the bearing lining held to the lower and upper bearing halves respectively in known manner by means of dovetail connections, indicated at 7 and 8 respectively. 9 is a conduit through which oil or like lubricant is supplied in sufficient quantity to produce complete fluid-film lubrication. Provided near the horizontal plane through the axis of rotation is a groove or recess 10 connected to a conduit 11 for discharging the lubricant. The bearing lining is partly cut away near the horizontal plane through the axis, as indicated at 12, to facilitate the flow of lubricant to the lower bearing half. The construction so far described may be considered as typical of any bearing arrangement in which oil or like lubricant is supplied to the shaft.

According to my invention I provide the upper bearing half with a recess 13, in the present instance shown as extending circumferentially over the entire arc and axially about three-quarters of the length of the upper bearing half. In this recess I provide a segment or segments, in the present instance illustrated as a single segment centrally arranged with respect to the upper bearing half and comprising an outer portion 14 and an inner portion 15 somewhat shorter in length than the outer portion and fastened thereto by means of a dovetail connection. The axial length of the portion 14 accordingly is equal to the axial length of the recess, that is, about three-fourths of the length of the bearing, and the circumferential width of the member 14 is about one-third of that of the recess, that is, in the present instance the circumferential width of the segment is of the order of sixty angular degrees. The inner portion 15, which floats on the shaft, is preferably made of the same metal as the bearing lining. In order to prevent sidewise movement of the segment I provide means such as dowel pins 16 fastened to the upper bearing half and entering holes 17 in the outer portion of the segment. 18 is a conduit for connecting an outer portion 20 of the recess 13 with the oil supply line 9. 21 and 22 are other conduits connecting the spaces adjacent the segment with oil line 9. Oil supplied through the latter conduits serves for lubricating and cooling the bearing. Oil supplied under pressure from conduit 9 to portion 20 of the recess forces the segment which floats on the shaft in radial direction towards the shaft. Preferably I provide an arrangement in which the oil pressure of the segment acts in the same direction as the static pressure on the shaft, that is, in case the shaft is loaded in downward direction, as assumed in the present instance, I provide the segment near the center of the upper bearing half, that is, radially opposite the load-carrying region of the bearing.

The oil pressure exerted on the outside of the segment forces the same towards the shaft whereby a small clearance between the segment and the upper bearing portion is created through which oil flows in sidewise direction. It will be readily understood that the oil pressure remains substantially constant as long as a stable condition of the rotating shaft exists. If, however, the shaft begins to whirl or whip for instance, due to a sudden change in load, the shaft forces the segment outwardly, to the effect that the flow of oil through conduit 20 and along the outer surface of the segment is restricted and an increased oil pressure is thereby built up. The increased oil pressure in turn has an increased stabilizing effect on the rotating shaft, more specifically, when the oil pressure during the upward movement of the shaft has reached a magnitude sufficient to overcome the upward force, the segment and the shaft will be forced downward. This relieves the high oil pressure whereby the shaft will force the segment upward again. Each upward movement of the shaft effects a building up of oil pressure in the upper bearing half and a consequent downward movement of the shaft under action of the oil pressure. From another viewpoint, the vibratory energy of the shaft causes building up of oil pressure whereby at least a part of the vibratory or whipping energy is dissipated. From another viewpoint, my invention comprises the provision of means for automatically stabilizing a rotary shaft supported by a bearing. These means include a conduit having an opening ending in a recess provided in the bearing. Located in said recess is a movable member having an outer surface adjacent the opening of the conduit and an inner surface adjacent the shaft. The conduit together with the member define a valve means which is moved in terms of radial movement of the shaft to increase automatically the oil pressure as the whipping or whirling of the shaft increases. From still another viewpoint, the member or segment has an inner surface bearing against the shaft and an outer surface subject to the oil pressure from the conduit. The outer wall defining the recess, and the outer surface of the segment define a channel for conducting oil under pressure or like fluid to the shaft. Whipping causes the segment to move radially outward to automatically decrease the cross area of said channel and accordingly increase the oil pressure, resulting in a reduction of the whipping. Thus, with an arrangement according to my invention the unstable behavior of a rotating shaft is effectively dampened.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:—

1. The combination with a shaft and a bearing having a bearing surface fitting the shaft and a recess in the bearing surface facing the shaft opposite the load carrying region, of a member provided in the recess and being movable radially relative to the shaft, and means for supplying oil under pressure to force the movable member towards the shaft to reduce vibratory movement of the latter.

2. The combination with a shaft and a bearing having a bearing surface fitting the shaft and a recess in the bearing surface facing the shaft opposite the load carrying region, of a segment in the recess floating on the shaft and being movable radially relative to the shaft, means for preventing sidewise movement of the segment, and means for supplying oil under pressure for forcing the segment toward the shaft to reduce vibratory movement of the latter.

3. The combination with a shaft and a bearing having a bearing surface fitting the shaft and a recess in the bearing surface facing the shaft opposite the load carrying region, of a segment provided in a part of the recess, said segment having a circumferential width of the order of sixty angular degrees and being movable radially relative to the shaft, means for supplying oil under pressure to the outside of the segment for forcing it towards the shaft to reduce vibratory movement of the latter, and means for supplying oil to another part of the recess.

4. The combination with a shaft and a bearing for the shaft, of means for automatically stabilizing the shaft to reduce whipping thereof comprising a conduit for conducting fluid under pressure to the bearing surface, and valve means for the conduit having a member opposite the load carrying region of the bearing moved by the shaft to automatically increase the oil pressure in response to radial movement of the shaft.

5. The combination with a rotary shaft and a bearing for the shaft having an upper and a lower bearing surface, of means for automatically stabilizing the shaft to reduce whipping thereof comprising a conduit having an open end portion terminating in a recess in the bearing surface for conducting oil under pressure to the bearing surface, a member in the recess having an outer surface facing the end portion of the conduit and an inner surface facing the shaft opposite the load carrying region of the bearing for automatically changing the oil pressure in response to radial movement of the shaft whereby the member is forced towards the shaft with an increased force as the whipping of the shaft increases.

6. The combination with a rotary shaft and a bearing for the shaft, of means for automatically stabilizing the shaft to reduce whipping thereof comprising a conduit having an open end portion terminating in a recess in the bearing surface for conducting fluid under pressure to the bearing, and means for automatically changing the fluid pressure in response to radial movement of the shaft, said means comprising a segment located in said recess with its outer surface subject to the oil pressure and its inner surface bearing against the shaft opposite the load carrying region of the bearing, and guide pins fastened in the bearing and entering holes in the outer surface of the segment whereby whipping of the shaft causes the segment to move towards the opening of said conduit to automatically increase the oil pressure.

7. The combination with a rotary shaft and a bearing for the shaft, of means for automatically stabilizing the shaft to reduce whipping thereof comprising a conduit for conducting fluid under pressure to a recess in the bearing surface, a segment in the recess having an inner surface bearing against the shaft opposite the load carrying region of the bearing and an outer surface subject to the fluid pressure and defining a channel for conducting fluid to the shaft, the segment being free to move radially towards and away from the shaft, whereby whipping of the shaft forces the segment radially outward to automatically decrease the cross area of said channel and accordingly increase the oil pressure.

8. The combination with a shaft and a bearing having a bearing surface fitting the shaft and a recess facing the shaft, of a movable member provided in the recess, and means for supplying oil under pressure to force the movable member towards the shaft, the movable member being located radially opposite the load-carrying region of the shaft whereby the static load on the shaft acts in the same direction as the oil pressure and aids in stabilizing the bearing.

JOHN H. DORAN.